United States Patent
Lewis et al.

(10) Patent No.: US 7,547,000 B2
(45) Date of Patent: Jun. 16, 2009

(54) VALVE COUPLING SYSTEM

(75) Inventors: Stephen Robert Lewis, Chillicothe, IL (US); Amy Shalaine Johanson, Normal, IL (US); James Joseph Streicher, Pontiac, IL (US)

(73) Assignee: Caterpillar Inc., Peoria, IL (US)

( * ) Notice: Subject to any disclaimer, the term of this patent is extended or adjusted under 35 U.S.C. 154(b) by 14 days.

(21) Appl. No.: 11/073,571

(22) Filed: Mar. 8, 2005

(65) Prior Publication Data

US 2006/0202151 A1 Sep. 14, 2006

(51) Int. Cl.
*F16K 31/02* (2006.01)
(52) U.S. Cl. .................. 251/129.16; 335/270; 335/276
(58) Field of Classification Search ............ 251/129.16; 335/261, 270, 276, 279
See application file for complete search history.

(56) References Cited

U.S. PATENT DOCUMENTS

| | | | |
|---|---|---|---|
| 4,658,232 A * | 4/1987 | Ohnuki .................. 335/270 |
| 4,852,853 A | 8/1989 | Toshio et al. |
| 5,183,075 A * | 2/1993 | Stein .................. 137/493.6 |
| 5,271,371 A | 12/1993 | Meints et al. |
| 5,697,342 A | 12/1997 | Anderson et al. |
| 5,749,527 A * | 5/1998 | Fujikawa et al. ......... 239/585.3 |
| 5,915,623 A | 6/1999 | Knight et al. |
| 6,199,774 B1 * | 3/2001 | Ricco .................. 239/533.8 |
| 6,305,355 B1 * | 10/2001 | Hoffmann et al. .......... 123/467 |
| 6,496,092 B1 | 12/2002 | Schnatterer |
| 6,848,669 B2 * | 2/2005 | Makino ................ 251/129.15 |
| 2003/0089873 A1 | 5/2003 | Modien |

* cited by examiner

*Primary Examiner*—John K Fristoe, Jr.
(74) *Attorney, Agent, or Firm*—Finnegan, Henderson, Farabow, Garrett & Dunner

(57) ABSTRACT

A method for coupling a valve member to an armature member includes coupling the valve member to a surface of a bore of the armature member. The valve member contacts the armature member over less than an entire axial thickness of the surface of the bore of the armature member. The method further includes aligning the armature member to a desired alignment and securing the valve member to the armature member at the desired alignment.

32 Claims, 7 Drawing Sheets

VALVE COUPLING SYSTEM

TECHNICAL FIELD

The present disclosure relates generally to a system and method for use in a valve assembly, and more particularly to a system and method for coupling a valve component to an armature component for use in a valve assembly.

BACKGROUND

Within a work machine, valve assemblies typically control the flow of a gas or liquid. A simple valve assembly has two positions. In its first position, the valve assembly prevents flow of the gas or liquid. In its second position, the valve assembly allows flow. More sophisticated valve assemblies simply expand on this idea. For example, a valve assembly may move between two positions. In its first position, the valve assembly may allow communication between a first passage and a second passage and prevent communication to and from a third passage. In its second position, the valve may prevent communication to and from the first passage and allow communication between the second and third passages.

Internal combustion engines of work machines that use fuel injectors require valves within the fuel injector to operate precisely. For example, some fuel injectors utilize a valve for controlling over when fuel is injected into the combustion chamber. One problem with valves in fuel injectors occurs when the valve components do not respond as predicted. For example, typically solenoid actuators in a fuel injector act on an armature connected to a valve component to control the movement of the valve component in the fuel injector. If the armature and the valve component are coupled improperly, the valve component may not respond as predicted. This could alter the timing of when fuel enters the combustion chamber and lead to inefficiencies and/or unwanted emissions.

Another problem an improperly coupled armature and valve component may cause is that the valve component may not seat properly. An improperly seated valve component may not fully close the valve, thereby allowing an undesired amount of fuel to enter the combustion chamber. This can also lead to inefficiencies and/or unwanted emissions in the work machine.

There are many ways to connect a valve component to an armature. U.S. Pat. No. 5,271,371 ("the '371 patent") discloses using a threaded fastener to join an armature to a valve component for use in a control valve of a fuel injector. This connection, however, has drawbacks. First, if after the armature was connected to the valve component it was discovered that the two components were not properly aligned, the costs and/or difficulty associated with correcting the misalignment may warrant discarding the entire assembly. If an improperly aligned armature and valve component are installed, the valve component may not obtain proper valve component seating around the circumference of the valve component. As noted above, this may prevent the valve component from fully closing and may cause leaks. As also noted above, such an improperly coupled armature and valve component may not respond as predicted due to the improper connection between the armature and the valve component. A valve component that does not respond as predicted may cause fuel inefficiencies and/or unwanted emissions.

The method and apparatus of the present disclosure solves one or more of the problems set forth above.

SUMMARY OF THE DISCLOSURE

In accordance with one exemplary embodiment, a method for coupling a valve member to a surface of a bore of an armature member is provided. The valve member contacts the armature member over less than an entire axial thickness of the surface of the bore of the armature member. The method further includes aligning the armature member to a desired alignment and securing the valve member to the armature member at the desired alignment.

In accordance with another exemplary embodiment of the present disclosure, a method is provided for coupling a valve member to an armature member. The method includes coupling the valve member to the armature member such that a substantial line contact is established between the valve member and a surface of a bore of the armature member. The method further includes aligning the armature member to a desired alignment and securing the valve member to the armature member at the desired alignment.

According to another exemplary embodiment, a valve member is provided that includes two reduced diameter portions separated by an intermediate portion having a maximum diameter greater than the diameter of either of the two reduced diameter portions. At least a portion of the intermediate portion includes an armature receiving portion.

According to yet another embodiment, a valve assembly is provided that includes a valve member having an intermediate portion positioned adjacent at least one reduced diameter portion. An armature member includes a bore sized to receive the valve member intermediate portion and sized to allow substantial angular movement relative to the valve member.

DETAILED DESCRIPTION

Reference will now be made in detail to exemplary embodiments of the disclosure, illustrated in the accompanying drawings. Wherever possible, the same reference numbers will be used throughout the drawings to refer to the same or like parts.

Figure 1:
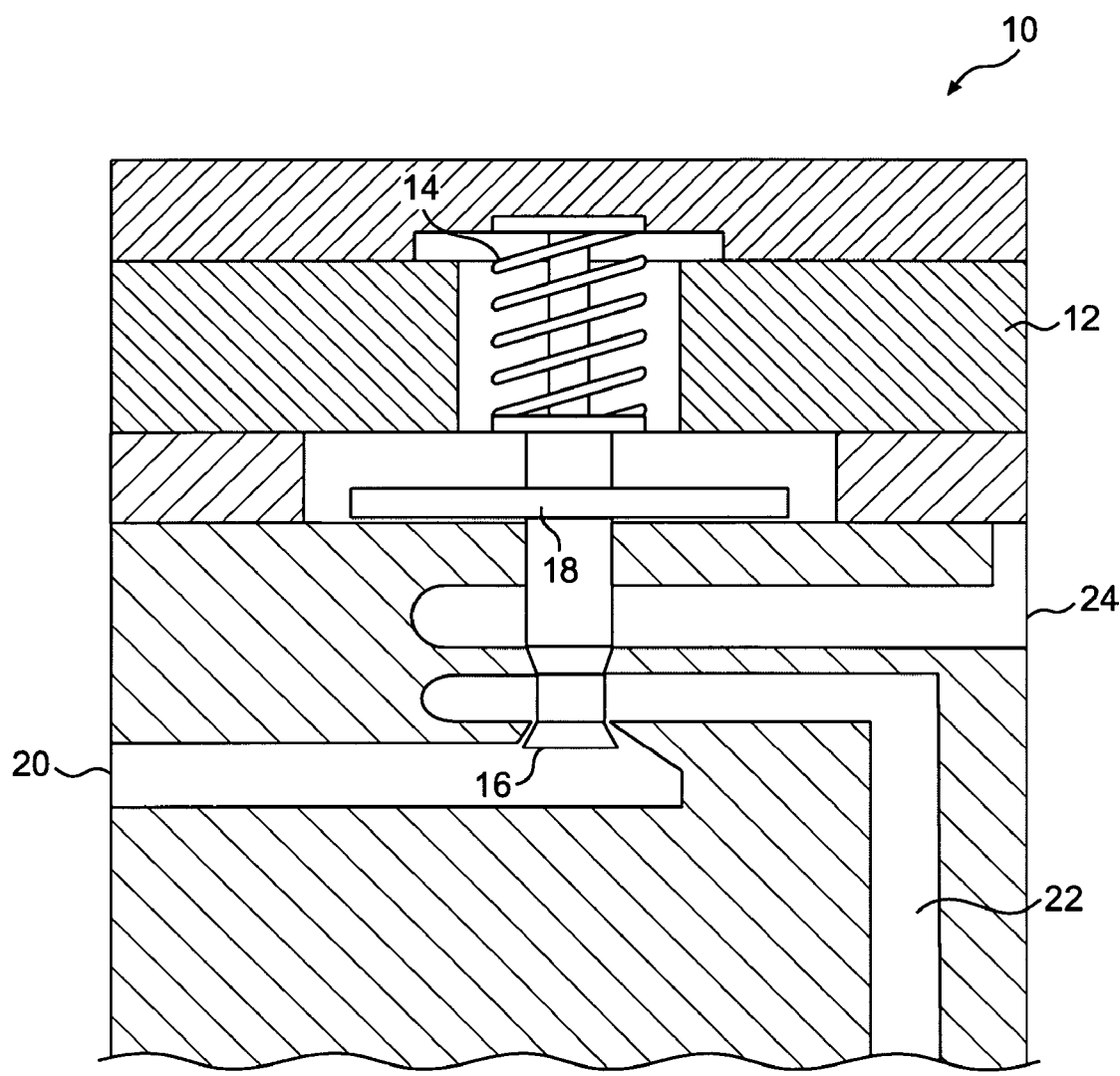
FIG. 1. is a partial cross-sectional side view of an exemplary solenoid actuated control valve assembly in accordance with the present disclosure.

Referring to the figures, a solenoid actuated control valve assembly 10 is shown generally in FIG. 1. Valve assembly 10 may be of the type utilized in admission valves, spill valves, check control valves, such as those found in, but not limited to, hydraulically actuated fuel injectors, mechanically actuated fuel injectors, and common rail fuel injectors.

Valve assembly 10 may include a solenoid 12, a bias spring 14, a valve member 16, an armature 18, a first passage 20, a second passage 22, and a third passage 24. It should be understood, however, that the system disclosed here is not limited for use with this particular valve assembly 10. It should be understood that the disclosed system may be utilized to join any valve component and any armature component for use in a valve assembly.

Bias spring 14 may bias armature 18 and valve member 16 downward towards a first or closed position. When activated, the solenoid 12 urges armature 18 and valve member 16 upwards towards a second or open position.

In its closed position as shown in FIG. 1, valve member 16 prevents fluid communication between third passage 24 and first and second passages 20, 22 and allows fluid communication between first and second passages 20, 22. In its open position, valve member 16 allows fluid communication between third passage 24 and second passage 22 and prevents fluid communication between first passage 20 and second and third passages 22, 24.

Figure 2:
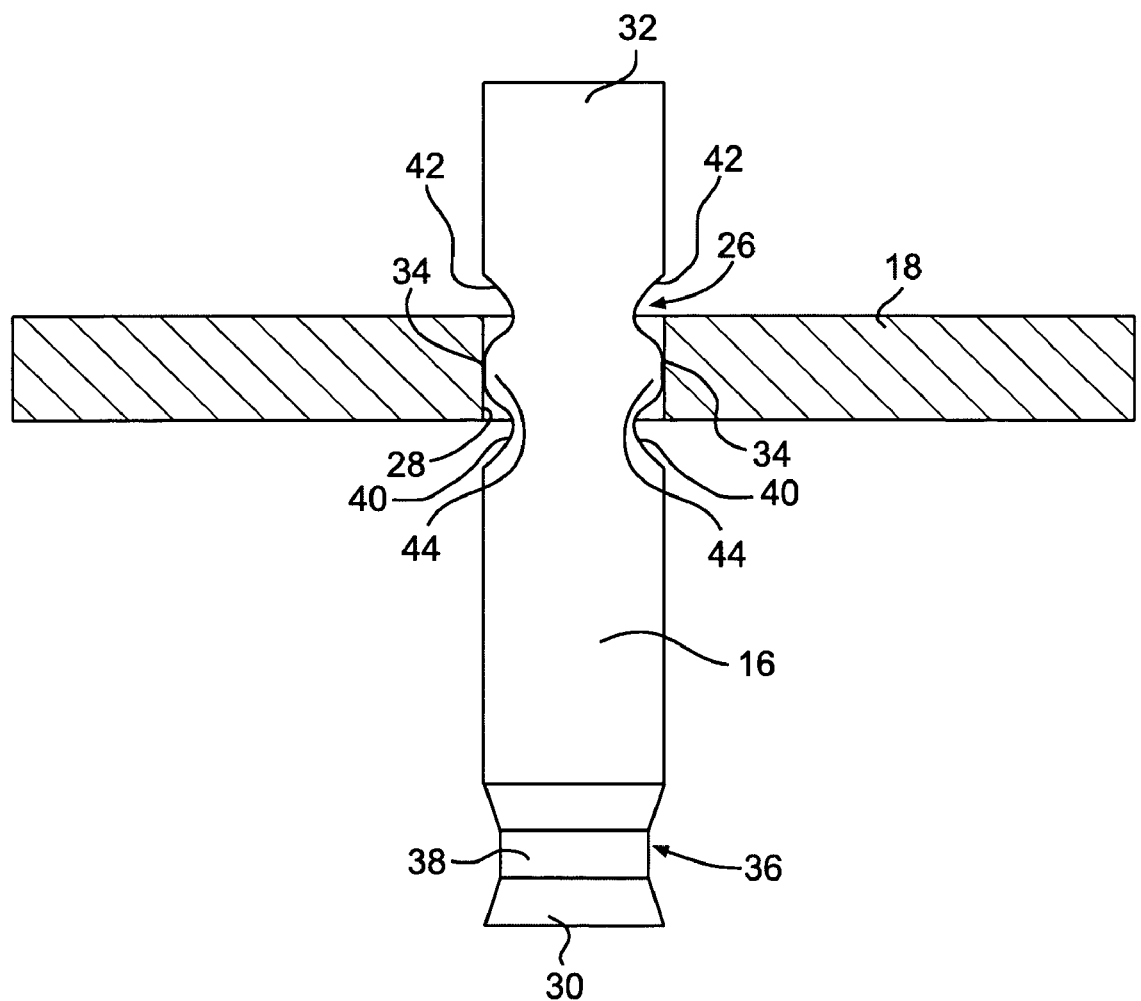
FIG. 2 is a partial cross-sectional side view of the armature and the valve member in accordance with the present disclosure.

Referring to FIG. 2, valve member 16 may be generally cylindrical in shape. Alternatively, valve member 16 may take another similar shape. Valve member 16 may have a seat end 30 positioned opposite from an armature end 32. Seat end 30 may include a varying diameter valve seat portion 36 where the diameter of valve member 16 tapers down on opposite sides, creating a first reduced diameter portion 38. Alternatively, the varying diameter valve seat portion 36 may include any other appropriate shape. For example, valve seat portion 36 may include a first increased diameter portion with a diameter larger than the maximum diameter of the seat end 30. Varying diameter valve seat portion 36 may be manufactured by cutting or grinding valve member 16. Alternatively, varying diameter valve seat portion 36 may be formed when valve member 16 is originally created using a mold or similar method of manufacturing.

Valve member 16 may include a second varying diameter portion 26 located near armature end 32. Second varying diameter portion 26 may include a second reduced diameter portion 40 and a third reduced diameter portion 42. The diameter of valve member 16 may gradually reduce to form second and third reduced diameter portions 40, 42. For example, second and third reduced diameter portions may be formed by cutting a planar or curved groove into valve member 16. Valve member 16 may also include an intermediate portion 44 located between second and third reduced diameter portions 40, 42.

Figure 3A:
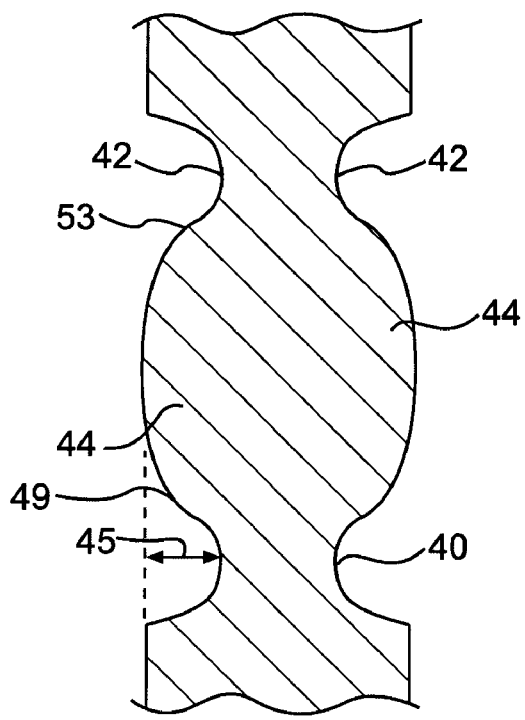
FIG. 3A is a cross-sectional side view of the valve member in accordance with one embodiment of the present disclosure.

For use with this disclosure, the intermediate portion 44 will be defined as that portion of the valve member 16 extending from a point 49 in FIG. 3a to a point 53. The point 49 may be located on the side of the second reduced diameter portion 40 closest to the third reduced diameter portion 42, and positioned at half the depth of the second reduced diameter portion 40. The point 53 may be located on the side of third reduced diameter portion 42 closest to the second reduced diameter portion 40, and positioned at half the depth of the third reduced diameter portion 42. It should be understood that point 49 and point 53 may be located at different depths. Second and third reduced diameter portions 40, 42 and intermediate portion 44 may be manufactured by cutting or grinding valve member 16 or, may be formed when valve member 16 is originally created using a mold or similar method of manufacturing. As will be described in more detail below, intermediate portion 44 may include a diameter the same as or slightly larger than the maximum diameter of the remaining portions of valve member 16.

Figure 3B:
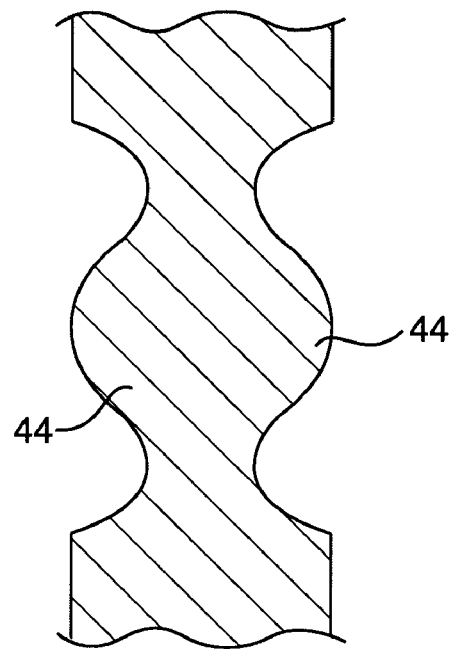
FIG. 3B is a cross-sectional side view of the valve member in accordance with an alternative embodiment of the present disclosure.
Figure 3C:
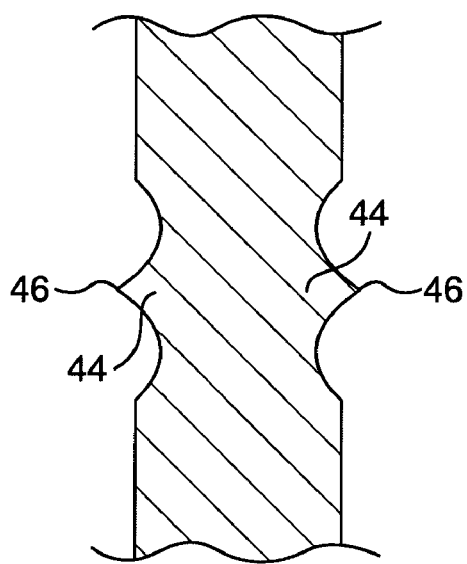
FIG. 3C is a cross-sectional side view of the valve member in accordance with yet another alternative embodiment of the present disclosure.
Figure 3D:
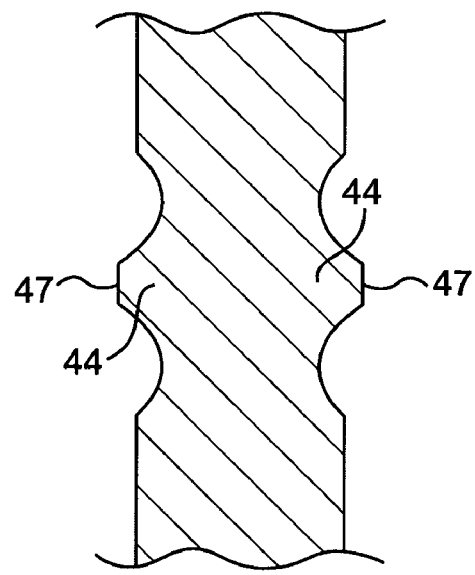
FIG. 3D is a cross-sectional side view of the valve member in accordance with another alternative embodiment of the present disclosure.

Intermediate portion 44 may be curved to include an elongated spherical or barrel shape as shown in FIG. 3A. Alternatively, intermediate portion 44 may be curved to include a substantially spherical shape as shown in FIG. 3B. Intermediate portion 44 may also taper substantially to form a point 46, shown in FIG. 3C, or a substantially straight portion 47, as shown in FIG. 3D. It should be understood that the intermediate portion 44 may take on any other shape and may include a maximum diameter of any size allowing for receipt and contact with armature 18. As shown in these figures, the maximum diameter of the intermediate portion 44 may be slightly larger than the minimum diameter of the remaining portions of valve member 16.

Figure 4A:
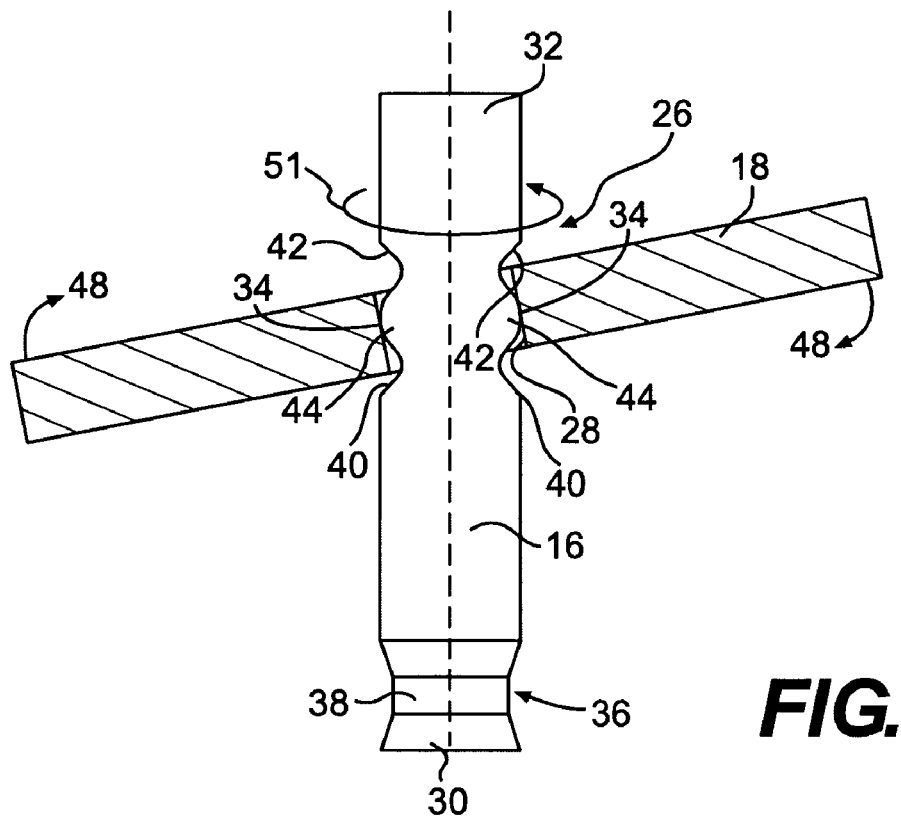
FIG. 4A is a partial cross-sectional side view of the armature and the valve member initially misaligned in accordance with the present disclosure.

Referring to FIG. 4A, the intermediate portion 44 may include an armature receiving portion 34 for contacting the armature 18 so as to allow for angular rotation of the armature 18 with respect to the valve member 16. In the exemplary embodiments, the armature receiving portion 34 may extend over a portion of intermediate portion 44 less than the axial thickness of armature 18 (FIGS. 3A-3C). For example, contact between the valve member 16 and the armature 18 at the armature receiving portion 34 may be substantially less than the axial thickness of the armature 18. For example, the armature 18 may contact armature receiving portion 34 over a substantially flat portion 47 of intermediate portion 44 as shown in FIG. 3D. Alternatively, the armature receiving portion 34 may provide substantially line contact with the armature 18 (FIGS. 3A-3C). As described herein substantially line contact includes a mating of the armature 18 with the intermediate portion 44 of the valve member 16 that allows for angular rotation in the directions 48 and 50 in FIGS. 4A and 4B in the magnitude of at least 20 degrees. The size of the armature receiving portion 34 may vary due to the inexactness of manufacturing these small components and the particular shape of the intermediate portion 44. It should be understood that the armature receiving portion 34 may take on any other shape and may include a maximum diameter of any size allowing for contact and angular rotation of the armature 18 with respect to the valve member 16.

Referring back to FIG. 2, armature 18 may be circular in shape and may include a bore 28. Bore 28 may be co-axially located at the center of armature 18. It should be understood that bore 28 could be located at another position on armature 18. Bore 28 may be created by cutting or grinding armature 18. Alternatively, armature 18 could be manufactured with bore 28 using a method known in the art. Bore 18 may be sized for receiving valve member 16 and may be generally cylindrical in shape and sized to allow for receipt of valve member 16 therethrough such that the intermediate portion 44 may be received within the bore 28.

Figure 7A:
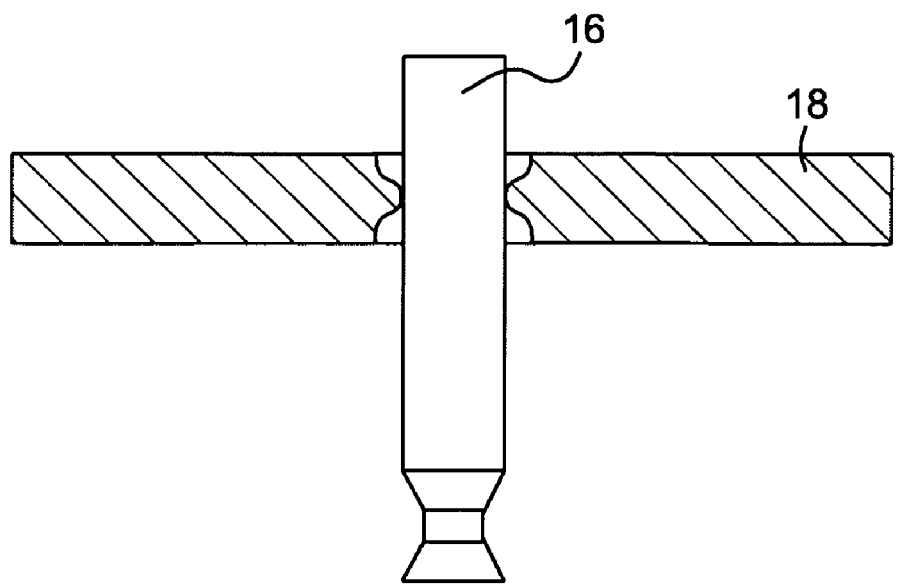
FIG. 7A is a partial cross-sectional side view of the armature and the valve member in accordance with another embodiment of the present disclosure.
Figure 7B:
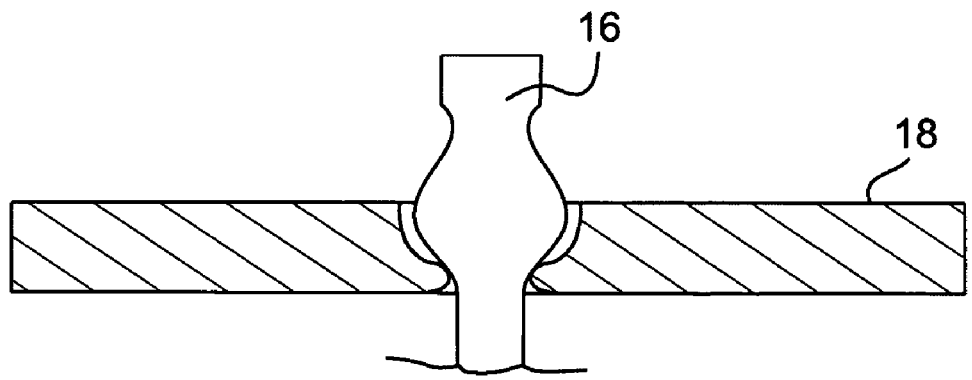
FIG. 7B is a partial cross-sectional side view of the armature and the valve member in accordance with another embodiment of the present disclosure.

It should be understood that the present disclosure may be practiced using an armature having a bore with varying diameters and a substantially constant diameter valve member as illustrated in FIG. 7A. Alternatively, both the bore and the valve member may include varying diameter portions for engaging one another, as illustrated in FIG. 7B.

INDUSTRIAL APPLICABILITY

Figure 4B:
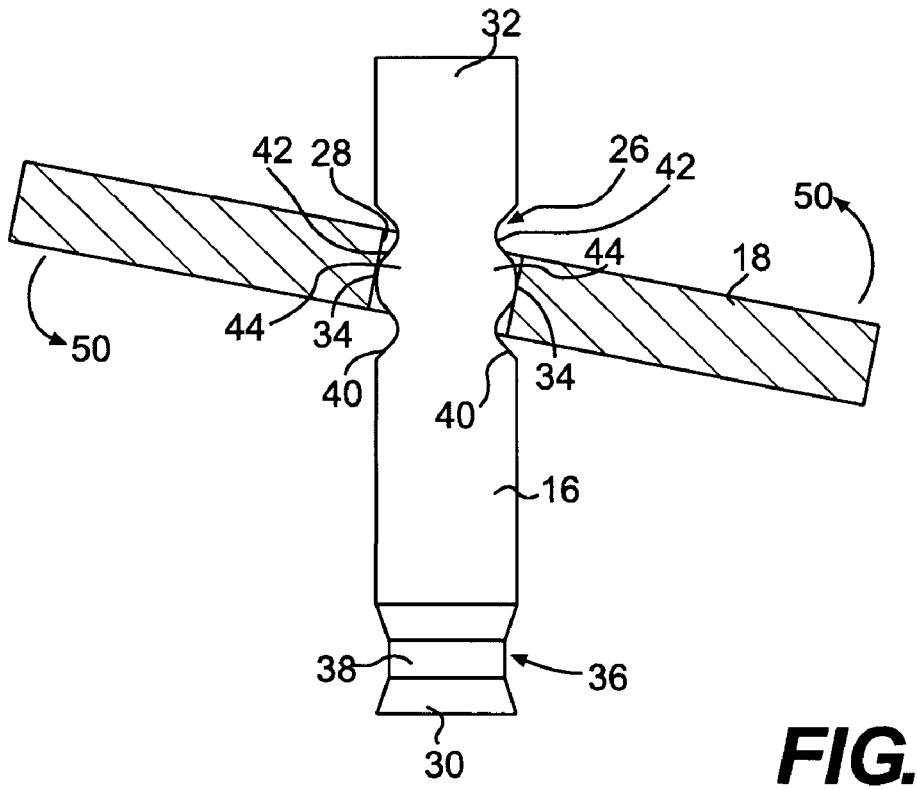
FIG. 4B is another partial cross-sectional side view of the armature and the valve member misaligned in accordance with the present disclosure.

Referring to FIG. 2, to couple valve member 16 to armature 18, one end of valve member 16 may be inserted into bore 28 of armature 18 until the slightly larger armature receiving portion 34 of the intermediate portion 44 contacts the bore 28 of armature 18. Because the armature receiving portion 34 contacts the bore 28 over a thickness less than the axial thickness of the bore 28, for example providing substantially line contact (FIG. 3A-3C), the armature 18 and valve member 16 can be re-aligned after valve member 16 is inserted into armature 18. Thus, armature 18 may be aligned as desired, for example, aligned generally perpendicular to valve member 16. To align the two components generally perpendicularly, the armature 18 may be angularly rotated. For example, FIG. 4A and FIG. 4B illustrate two possible alignments between armature 18 and valve member 16 after valve member 16 has been inserted into bore 28. It should be understood that other alignments are possible. Rotating armature 18 as indicated by arrow 48 in FIG. 4A and by arrow 50 in FIG. 4B allows for aligning armature 18 generally perpendicularly to valve member 16. Additionally, if required, armature 18 and valve member 16 may be rotated relative to one another about a longitudinal axis of valve member 16 as shown by arrow 51 in FIG. 4A.

Figure 5:
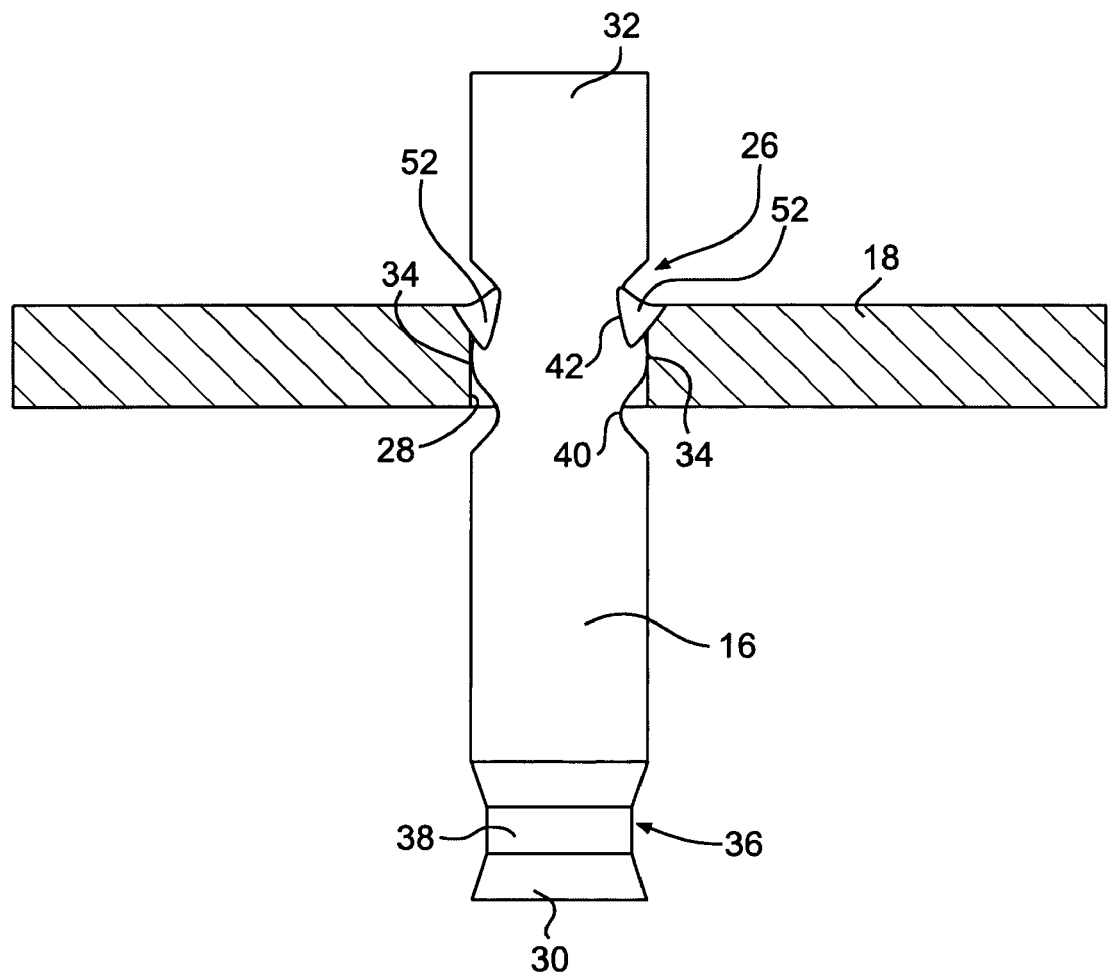
FIG. 5 is a partial cross-sectional side view of the armature and the valve member secured to one another in accordance with the present disclosure.

Referring to FIG. 5, once aligned perpendicularly to one another, armature 18 and valve member 16 are secured together. In the preferred embodiment, armature 18 is secured to valve member 16 using a weld. Welding material 52 is positioned between bore 28 of armature 18 and third reduced diameter portion 42 of valve member 16. Next, the components are welded together. Once the weld is completed, the welding material 52, armature 18, and valve member 16 form a secured or fixed unit. It should be understood that the weld may be alternatively applied by positioning the welding material 52 between bore 28 and second reduced diameter portion 40 and applying the weld at this position. It should be further understood that a weld may be placed between bore 28 and both second and third reduced diameter portions 40, 42. Other methods known in the art may be used to secure armature 18 to valve member 16 after the desired alignment, such as using resins, mechanical fasteners and the like.

In the exemplary embodiments, valve member 16 may be pre-hardened before being secured to armature 18. Pre-hardening valve member 16 may serve to add strength to the coupling between armature 18 and valve member 16 and may be achieved in any conventional manner.

Figure 6:
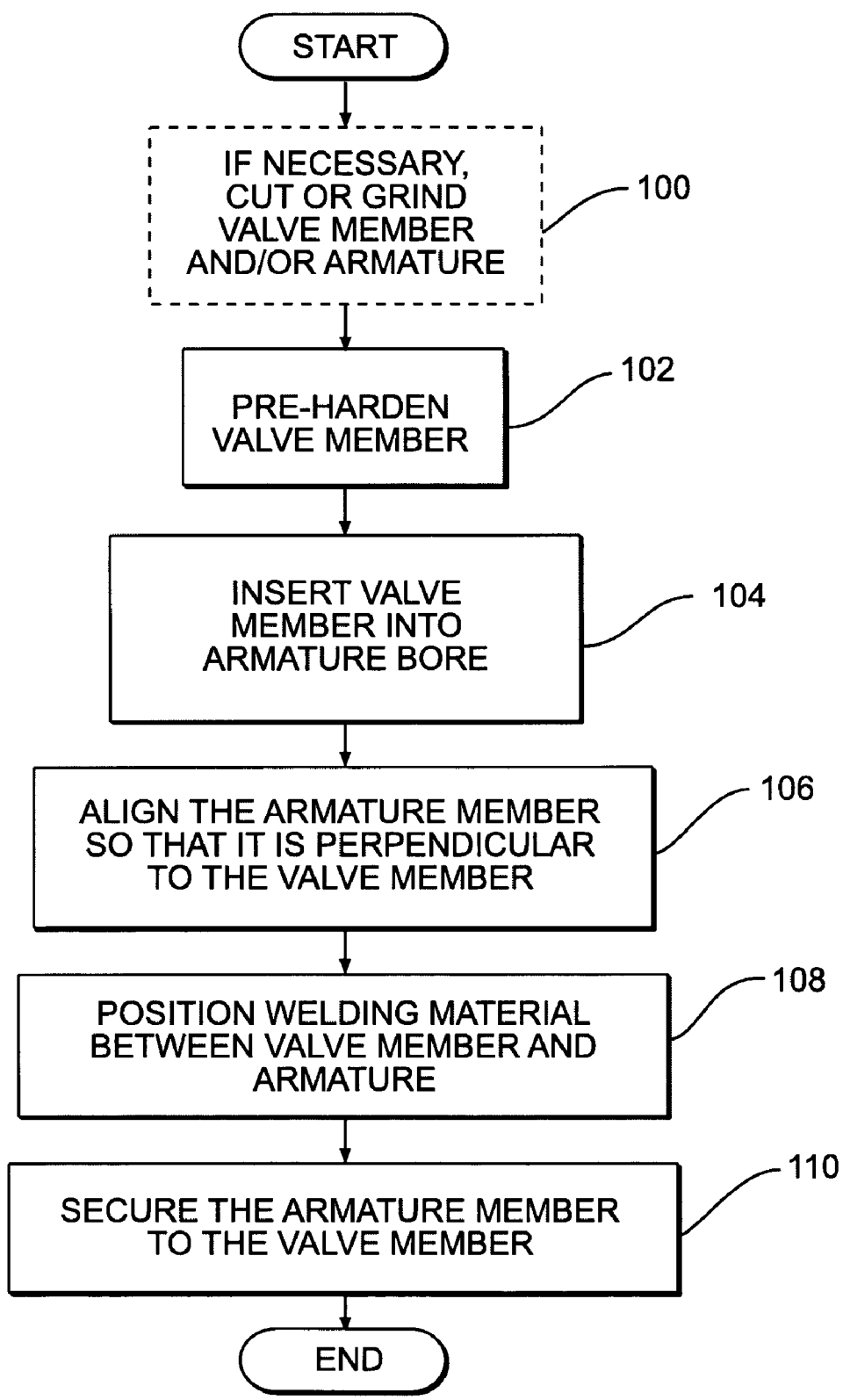
FIG. 6 is a flowchart illustrating an exemplary method of manufacturing in accordance with the present disclosure.

The flow chart of FIG. 6 illustrates a method for coupling armature 18 to valve member 16. The first step may include cutting or grinding valve member 16 to create first, second and third reduced diameter portions 38, 40, 42. (Step 100). This step may or may not be necessary based on the type of process used to form the valve member 16. Also if necessary, the first step may include cutting or grinding armature member 16 to create bore 28. (Step 100). Next, the valve member 16 may be pre-hardened. (Step 102). This may be practiced in any conventional way, such as heating the valve member to a certain temperature to obtain a desired carbonization.

Valve member 16 is next inserted into bore 28 of armature 18 until the slightly larger armature receiving portion 34 of the intermediate portion 44 engages bore 28 of armature 18. (Step 104). It should be understood that the present disclosure may be practiced using an interference fit between armature 18 and valve member 16 such that valve member 16 may be pressed into bore 28 of armature 18. Alternatively, the bore 28 may be expanded by heating before valve member 16 is inserted into bore 28. Therefore, this step may or may not include heating up the bore 28 to allow for the formation of an interference fit between valve member 16 and armature 18. Next, armature 18 is angularly rotated to align armature 18 in a desired manner, such as substantially perpendicular to valve member 16. (Step 106). As noted above, the size of the contact between the armature receiving portion 34 of the valve member 16 and the bore 28 of the armature 18 allows for the angular rotation between the armature 18 and the valve member 16. The armature receiving portion 34 contacts the bore 28 over a thickness less than the axial thickness of the bore 28 or over substantially line contact. This may be achieved with the assistance of additional, removable hardware that assures the desired alignment. Welding material 52 is positioned between bore 28 and the valve member 16, i.e., at the third reduced diameter portion 42. (Step 108). Using the welding material 52, the armature 18 and the valve member 16 are welded together to form a secure or fixed unit. (Step 110). It should be understood, however, that the armature 18 and the valve member 16 may be welded together with a laser or similar welding process known in the art without using the welding material 52.

The system disclosed ensures proper alignment between the valve member 16 and the armature 18 before coupling the two components together. This allows for more accurate operation as the armature member and valve member will respond as predicted. Furthermore, proper alignment between the valve member and the armature member ensures that the valve member will get proper valve seating. Proper valve member seating assists in preventing an undesired amount of fuel from entering the combustion chamber causing unwanted emissions and/or inefficiencies. Proper valve member seating also assists in ensuring fuel enters the combustion chamber only at the desired time further preventing inefficiencies and unwanted emissions.

Other embodiments of the disclosure will be apparent to those skilled in the art from consideration of the specification and practice of the disclosure discussed herein. For example, it is understood that while the intermediate portion 44 is described as being slightly larger than the valve member 16, intermediate portion 44 may include the same maximum diameter as other portions of the valve member 16. In such an instance, the maximum diameter of the intermediate portion 44 may be substantially equal to or larger than the bore 28 of the armature 18. As described above, when the intermediate portion 44 is larger than the bore 28, the bore 28 could be heated, and thus expanded, to allow for assembly with the valve member 16. It is intended that the specification and examples be considered as exemplary only, with a true scope and spirit of the disclosure being indicated by the following claims and their equivalents.

What is claimed is:

1. A method for coupling a valve member to an armature member, comprising:

coupling the valve member to a surface of a cylindrical bore of the armature member such that the valve member contacts the armature member over less than an entire axial length of the surface of the cylindrical bore of the armature member aligning the armature member such that the axial length extends substantially parallel to the valve member; and welding the valve member to the armature member.

2. The method of claim 1, wherein the valve member includes at least one reduced diameter portion assisting in establishing the contact between the valve member and the armature member.

3. The method of claim 2, wherein the at least one reduced diameter portion includes two reduced diameter portions located on opposite sides of an intermediate portion, and the intermediate portion includes a portion that provides the contact with the armature member.

4. The method of claim 3, wherein the intermediate portion is generally spherical in shape.

5. The method of claim 3, wherein the intermediate portion is generally barrel shaped.

6. The method of claim 3, wherein the intermediate portion is shaped to taper substantially to form a point.

7. The method of claim 3, wherein the intermediate portion is shaped to include a generally flat portion.

8. The method of claim 3, wherein the intermediate portion includes a diameter greater than the diameter of the remaining portions of the valve member.

9. The method of claim 1, wherein the method further includes pre-hardening the valve member.

10. A method for coupling a valve member to an armature member, comprising:

coupling the valve member to the armature member such that a substantial line contact is established between the valve member and a surface of a cylindrical bore of the armature member, the valve member including at least one reduced diameter portion disposed within the cylindrical bore and spaced apart from the surface of the bore;

aligning the armature member at a desired alignment to the valve member; and fixing the valve member to the armature member at the desired alignment to prohibit relative movement between the valve member and armature member.

11. The method of claim 10, wherein the at least one reduced diameter portion assists in establishing the substantial line contact between the valve member and the surface of the bore of the armature member.

12. The method of claim 11, wherein the at least one reduced diameter portion includes two reduced diameter portions located on opposite sides of an intermediate portion, and the intermediate portion includes a portion providing the substantial line contact between the valve member and the surface of the bore of the armature member.

13. The method of claim 12, wherein the fixing of the valve member to the armature member includes welding.

14. The method of claim 12, wherein the intermediate portion is generally spherical in shape.

15. The method of claim 14, wherein the method further includes pre-hardening the valve member.

16. The method of claim 12, wherein the surface of the bore is generally curved in shape.

17. A valve member movable within a fuel injector to permit and prohibit fuel flow within the fuel injector, the valve member comprising:

two reduced diameter portions separated by an intermediate portion and disposed between two increased diameter portions, the intermediate portion having a maximum diameter greater than a minimum diameter of either of the two reduced diameter portions, and the increased diameter portions each having a maximum diameter greater than the minimum diameter of each of the reduced diameter portions, wherein the maximum diameter of the intermediate portion includes an armature receiving portion configured to be disposed in a cylindrical bore in an armature and to contact a side of the cylindrical bore, and at least one of the two reduced diameter portions is configured to be disposed in the bore and to be out of contact with the side of the bore.

18. The valve member of claim 17, wherein valve member further includes a valve seat portion including varying diameter portions.

19. The valve member of claim 18, wherein the valve member further includes a center portion generally cylindrical in shape, the center portion being located between one of the reduced diameter portions and the valve seat portion.

20. The valve member of claim 19, wherein the intermediate portion is generally spherical in shape.

21. The valve member of claim 20, wherein the two reduced diameter portions are generally curved in shape.

22. The valve member of claim 21, wherein the intermediate portion is generally barrel shaped.

23. The valve member of claim 19, wherein the intermediate portion is shaped to taper substantially to form a point.

24. The valve member of claim 19, wherein the intermediate portion is shaped to include a generally flat portion.

25. The valve member of claim 17, where the armature receiving portion is configured to allow for tilting of an armature received thereon.

26. A valve assembly, comprising:

a fuel injector housing; and a valve unit disposed within the fuel injector housing and configured to permit and prohibit fuel flow between passages in the fuel injector housing, the valve unit comprising:

a valve member having an intermediate portion positioned adjacent at least one reduced diameter portion; and an armature member including a cylindrical bore sized to receive and contact the valve member intermediate portion while being sized to receive the reduced diameter portion and be spaced apart from a surface of the reduced diameter portion, the intermediate portion and armature bore being configured to allow substantial angular tilting movement of the armature member relative to the valve member before the valve member and armature member are fixed to one another to form the valve unit.

27. The valve assembly of claim 26, wherein the at least one reduced diameter portion includes two reduced diameter portions located on opposite sides of the intermediate portion.

28. The valve assembly of claim 27, wherein the two reduced diameter portions are generally curved in shape.

29. The valve assembly of claim 27, wherein the intermediate portion is generally barrel shaped.

30. The valve assembly of claim 27, wherein the intermediate portion is generally spherical in shape.

31. The valve assembly of claim 27, wherein the intermediate portion is shaped to taper substantially to form a point.

32. The valve assembly of claim 27, wherein the intermediate portion is shaped to include a generally flat portion.

* * * * *